United States Patent
Boehl et al.

(10) Patent No.: US 10,608,822 B2
(45) Date of Patent: Mar. 31, 2020

(54) EFFICIENT CALCULATION OF MESSAGE AUTHENTICATION CODES FOR RELATED DATA

(71) Applicant: NXP B.V., Eindhoven (NL)

(72) Inventors: Florian Boehl, Leuven (BE); Simon Johann Friedberger, Leuven (BE); Thierry G. C. Walrant, Bouge (BE)

(73) Assignee: NXP B.V., Eindhoven (NL)

( * ) Notice: Subject to any disclaimer, the term of this patent is extended or adjusted under 35 U.S.C. 154(b) by 154 days.

(21) Appl. No.: 15/497,419

(22) Filed: Apr. 26, 2017

(65) Prior Publication Data
US 2018/0316504 A1 Nov. 1, 2018

(51) Int. Cl.
*H04L 9/32* (2006.01)
*H04L 9/06* (2006.01)
*H04L 9/14* (2006.01)
*H04L 29/06* (2006.01)

(52) U.S. Cl.
CPC .......... *H04L 9/3242* (2013.01); *H04L 9/0618* (2013.01); *H04L 9/0643* (2013.01); *H04L 9/14* (2013.01); *H04L 63/0428* (2013.01); *H04L 2209/125* (2013.01)

(58) Field of Classification Search
CPC ... H04L 9/3242; H04L 9/0618; H04L 9/0643; H04L 9/14; H04L 63/0428; H04L 2209/125
USPC .......................................................... 713/161
See application file for complete search history.

(56) References Cited

U.S. PATENT DOCUMENTS

| | | | | |
|---|---|---|---|---|
| 5,673,318 A | * | 9/1997 | Bellare | H04L 9/0625 380/29 |
| 6,044,155 A | * | 3/2000 | Thomlinson | G06F 21/6245 380/277 |
| 6,587,947 B1 | * | 7/2003 | O'Donnell | G06F 21/57 713/161 |
| 6,845,448 B1 | | 1/2005 | Carman | |
| 6,845,449 B1 | | 1/2005 | Carman et al. | |
| 6,976,168 B1 | * | 12/2005 | Branstad | H04L 9/0643 380/280 |
| 8,090,098 B2 | | 1/2012 | Kim et al. | |
| 8,627,092 B2 | * | 1/2014 | Fischer | H04W 12/06 713/181 |
| 8,665,857 B2 | * | 3/2014 | Meylan | H04W 74/0866 370/349 |

(Continued)

OTHER PUBLICATIONS

Zhang et al., iFeed[AES] v1, Trusted Computing and Information Assurance Laboratory, Mar. 15, 2014 (Year: 2014).*

(Continued)

*Primary Examiner* — Christopher A Revak

(57) ABSTRACT

A method of computing a message authentication code (MAC) for a message having a common part and an independent part using a constrained processor, including: performing a MAC function on the common part of the message using a first secret key to produce a first output; performing a pseudorandom function on the independent part of the message using a second key to produce a second output, wherein the computation time of the pseudorandom function is significantly less than the computation time of the MAC function; and combining the first output and the second output to produce a computed MAC for the message.

20 Claims, 2 Drawing Sheets

(56) References Cited

U.S. PATENT DOCUMENTS

| | | | | |
|---|---|---|---|---|
| 8,799,679 | B2* | 8/2014 | Garay | H04L 9/0631 |
| | | | | 713/190 |
| 8,949,600 | B2* | 2/2015 | Paddon | H04L 9/3242 |
| | | | | 380/37 |
| 9,425,963 | B2 | 8/2016 | Nairn | |
| 2002/0051537 | A1* | 5/2002 | Rogaway | H04L 9/0643 |
| | | | | 380/46 |
| 2004/0123102 | A1* | 6/2004 | Gehrmann et al. | H04L 9/00 |
| | | | | 713/161 |
| 2007/0173229 | A1* | 7/2007 | Dong | H04L 63/0853 |
| | | | | 455/411 |
| 2007/0178886 | A1* | 8/2007 | Wang | H04L 63/0869 |
| | | | | 455/411 |
| 2009/0037747 | A1* | 2/2009 | Xie | G06F 21/85 |
| | | | | 713/192 |
| 2011/0083014 | A1* | 4/2011 | Lim | H04L 29/12764 |
| | | | | 713/168 |
| 2014/0229744 | A1* | 8/2014 | Doumen | G06F 21/121 |
| | | | | 713/190 |
| 2014/0298375 | A1* | 10/2014 | Isozaki | H04N 21/25816 |
| | | | | 725/30 |
| 2015/0261965 | A1* | 9/2015 | Brumley | G06F 21/602 |
| | | | | 713/193 |
| 2015/0281254 | A1* | 10/2015 | Sharma | H04L 63/0876 |
| | | | | 726/4 |
| 2015/0358154 | A1* | 12/2015 | Garcia Morchon | H04L 9/0656 |
| | | | | 380/28 |
| 2016/0026787 | A1 | 1/2016 | Nairn | |
| 2016/0241389 | A1* | 8/2016 | Le Saint | H04L 9/0844 |
| 2017/0272944 | A1* | 9/2017 | Link, II | H04W 4/70 |
| 2019/0116046 | A1* | 4/2019 | Hoyer | H04L 63/0428 |
| 2019/0260722 | A1* | 8/2019 | Basin | H04L 9/0637 |

OTHER PUBLICATIONS

Anubhab Baksi, Subhamoy Maitra, and Santanu Sarkar. New Distinguishers for Reduced Round Trivium and Trivia-SC Using Cube Testers (Extended Abstract). 2015. WCC 2015-9th International Workshop on Coding and Cryptography. (Year: 2015).*

Zhang, Liting et al; "iFeed [AES] v1"; retreived from the Internet: http://competitions.cy.yp.to/round1/ifeedaesvl.pdf on May 24, 2018; 33 Pages (Mar. 25, 2014).

Wang, Qiyan et al; "VeCure: A practical security framework to protect the CAN bus of vehicles"; IEEE Int'l Conference on the Internet of Things (IOT); pp. 13-18 (Oct. 6, 2014).

Mouha, Nicky et al; "Chaskey: An Effiient MAC Algorithm for 32-bit Microcontrollers"; Medical Image Computing and Computer-Assisted Intervention International Conferene, Munich, Germany; Springer International Publishing, retreived Nov. 29, 2014; 18 pages (Nov. 29, 2014).

* cited by examiner

EFFICIENT CALCULATION OF MESSAGE AUTHENTICATION CODES FOR RELATED DATA

TECHNICAL FIELD

Various exemplary embodiments disclosed herein relate generally to the efficient calculation of message authentications codes (MACs) for related data and for the efficient transmission of low-entropy data in the presence of MACs.

BACKGROUND

In communication systems, a standard cryptographic method to ensure the integrity and authenticity of exchanged messages is to add a message counter and a message authentication code (MAC) to each message. In many cases it is necessary to calculate many such MACs for similar messages. It is for example common to include a receiver ID in the message. If a device wants to send a broadcast message to many receivers it is reasonable to assume that most of the message will stay the same but the receiver ID will change. Other possible low-entropy parts are the aforementioned counter or the sender ID if there is a small set of expected senders. In the conventional approach a MAC needs to be computed for every outgoing message. This might not be feasible on constrained devices, such as devices with limited processing capability, limited memory, or limited storage.

Further, when the bandwidth of communication channels is very low or must be used sparingly, a standard optimization technique in this situation is to send only a fixed selection of MAC bits.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a method of computing a message authentication code (MAC) for a message having a common part and an independent part using a constrained processor, including: performing a MAC function on the common part of the message using a first secret key to produce a first output; performing a pseudo-random function on the independent part of the message using a second key to produce a second output, wherein the computation time of the pseudorandom function is significantly less than the computation time of the MAC function; and combining the first output and the second output to produce a computed MAC for the message.

Various embodiments are described wherein combining the first output and the second output to produce a MAC for the message includes performing a hash function on the first and second output.

Various embodiments are described wherein combining the first output and the second output to produce a MAC for the message includes XORing the first output and the second output, and an alternating step generator is executed on the output of the XOR.

Various embodiments are described wherein combining the first output and the second output to produce a MAC for the message includes inputting the first output and the second output to a reduced round block cipher.

Various embodiments are described wherein combining the first output and the second output to produce a MAC for the message includes applying a stream cipher with a reduced number of initialization rounds to the first output and the second output.

Various embodiments are described, further including: receiving the message along with a message MAC; and comparing the message MAC to the computed MAC.

Various embodiments are described further including: receiving the message; appending the message MAC to the message; and transmitting the message and the appended message MAC.

Various embodiments are described wherein performing a pseudorandom function on the independent part of the message using a second key to produce a second output further includes: precomputing the pseudorandom function for a known set values for the independent part of the message; storing the precomputed second output values; selecting a corresponding precomputed second output value when the independent part of the message is a value in the known set of values, and comparing the message MAC to the computed MAC.

Various embodiments are described wherein when a N broadcast messages are received wherein N is an integer, combining the first output and the second output to produce a computed MAC for the message further includes: combining the first output with each of the N precomputed second outputs corresponding to each of the plurality of broadcast messages.

Further various exemplary embodiments relate to a method of computing a message authentication code (MAC) for a message having a header, a payload, and a counter with most significant bits (MSBs) and least significant bits (LSBs) using a constrained processor, including performing a MAC function on the header, payload, and LSBs using a first secret key to produce a first output; performing a pseudorandom function on the MSBs using a second key to produce a second output; and combining the first output and the second output to produce a computed MAC for the message; and transmitting the header, payload, LSBs, and the computed MAC, wherein the computation time of the pseudorandom function is significantly less than the computation time of the MAC function.

Various embodiments are described wherein combining the first output and the second output to produce a MAC for the message includes performing a hash function on the first and second output.

The Various embodiments are described wherein combining the first output and the second output to produce a MAC for the message includes XORing the first output, the second output, and an alternating step generator.

Various embodiments are described wherein combining the first output and the second output to produce a MAC for the message includes inputting the first output and the second output to a reduced round block cipher.

Various embodiments are described wherein combining the first output and the second output to produce a MAC for the message includes applying a stream cipher with a reduced number of initialization rounds to the first output and the second output.

Further various exemplary embodiments relate to a method of computing a message authentication code (MAC) for a received message having a header, a payload, and least significant bits (LSBs) of a counter and least significant bits (LSBs) using a constrained processor, including: receiving the message along with a message MAC; performing a MAC function on the header, payload, and LSBs using a first secret key to produce a first output; performing a pseudorandom function on the MSBs using a second key to produce a second output, wherein the computation time of the pseudorandom function is significantly less than the computation time of the MAC function; and combining the first output and the second output to produce a computed MAC for the message; and comparing the message MAC to the computed MAC.

Various embodiments are described further including: when the computed MAC is not equal to the message MAC, repeating until computed MAC equals the message MAC or until M iterations have been performed where M is an integer; incrementing the value of the MSBs by one; performing a pseudorandom function on the incremented MSBs using a second key to produce the second output; combining the first output and the second output to produce the computed MAC for the message; and comparing the message MAC to the computed MAC.

Various embodiments are described wherein combining the first output and the second output to produce a MAC for the message includes performing a hash function on the first and second output.

Various embodiments are described wherein combining the first output and the second output to produce a MAC for the message includes XORing the first output and the second output, and an alternating step generator is executed on the output of the XOR.

Various embodiments are described wherein combining the first output and the second output to produce a MAC for the message includes inputting the first output and the second output to a reduced round block cipher.

Various embodiments are described wherein combining the first output and the second output to produce a MAC for the message includes applying a stream cipher with a reduced number of initialization rounds to the first output and the second output.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
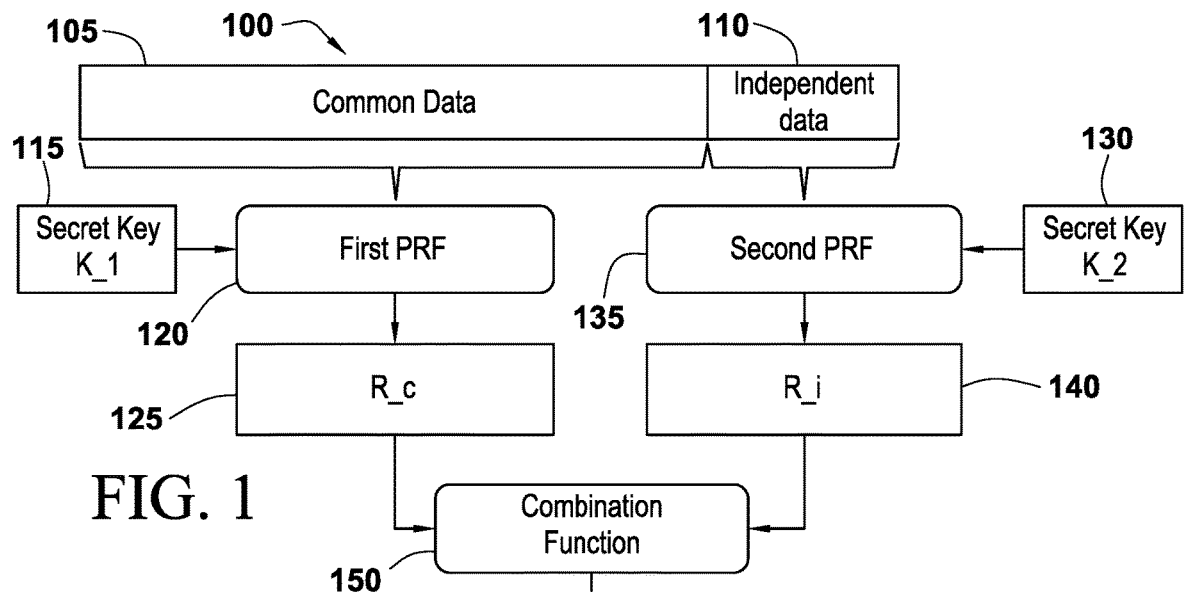
FIG. 1 illustrates a two-step calculation of a MAC for a message with common data and independent data.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

To guarantee that a message in a system was sent by a specific entity message authentication codes (MACs) may be used. MACs authenticate messages as being sent by somebody who is in possession of a specific secret key. The MAC function is applied to the message content resulting in a MAC, and the MAC is then sent with the message. The MAC function may be a cryptographic operation using a secret key that is applied to the message to produce the MAC. The receiving party is also in possession of the secret key. The receiving party applies the same MAC function to the received message using the same secret key. If the computed MAC is the same as the received MAC then the receiving party is able to verify the message. The use of a MAC helps to prevent the tampering of messages that are sent over a network, because any change in the message by an attacker will result in the receiver calculating a different MAC value from that attached to the message. MAC functions are designed in a way that makes it infeasible to compute the MAC for a message without knowledge of the secret key. When implemented on constrained embedded processors with a specific purpose, MAC functions are expensive to evaluate in comparison to other tasks the processor is intended for. As a result, using MACs in environments with constrained computing resources becomes difficult.

Various MAC functions and protocols have been developed and are well known. Various standards bodies have defined MAC functions and protocols. Any of these may be used in the embodiments described herein.

Embodiments are described where the computationally intensive operation of computing a MAC for a message is done only once for a common part of the message and pseudorandom functions (PRFs) are used on the independent data in the message, for example different sender IDs. The computation time for the PRF is much faster than the computation time for the MAC. The computation of the MAC for the common part of the message is then combined with the output of the PRFs on the independent data in the message resulting in the MAC for the message.

Other embodiments are described where low entropy parts of the message are omitted. For example, messages may include a counter value to prevent replay attacks. The most significant bytes of this counter are what will be omitted to reduce message size. These counter bytes may be recovered by the receiver from the MAC with minimal overhead. Therefore allowing the use of MACs even in extremely constrained environments with real-time requirements where extensive computations are not feasible. While a message counter is used as an example herein, the technique may also be extended to any kind of low-entropy part of messages.

As discussed above, for extremely constrained devices, calculating MACs can be a very costly operation. However in a broadcast scenario, it may be necessary to compute MACs for many messages with similar contents. The embodiments described herein improve this situation by first using only the common part of the messages as input to a typical MAC function and then applying a PRF to the independent part of the messages in a second step, where the calculation of the PRF can be computed separately and is, for a suitably selected PRF, faster than calculating the MAC function for the complete message. A PRF is a pseudorandom function, i.e., a function that cannot be distinguished from a function picked at random from the set of all functions. Separate computation for the two parts of the messages also allows for parallelization, precomputation, and caching. Afterwards the two outputs are combined into a MAC for the entire message. This effectively calculates a MAC in a two-step procedure where the second step that is performed on the changing portions of the message is much faster.

Related MACs can be computed fast by using a two-step MAC computation process. First, a precomputation is performed on the common part. In a second step, a function of the independent part is combined with this precomputed value. The second step is faster or can be precomputed in certain situations, as well.

FIG. 1 illustrates a two-step calculation of a MAC for a message with common data and independent data. An input message 100 may have common data 105 and independent data 110. For example, when certain data is broadcast to a number of different locations and/or users, there will be common data 105 that is sent to each location and/or user, and then there will be independent data 110 that identifies for example the location and/or user that will be different for each broadcast message.

A first PRF 120 may be applied to the common data 105 using a first secret key 115. The first PRF 120 may be any known MAC function that uses a secret key. The output of the first PRF 120 is R_c 125. A second PRF 135 may be applied to the independent data 110 using a second secret key 130. The output of the second PRF 135 is R_i 140. A combination function 150 may then be applied to R_c 125 and R_i 140 to produce the MAC 155 of the input message 100.

The second PRF 135 may be one of many known PRFs. Such PRFs may be implemented by calculating polynomials to give a pseudorandom output based upon the specific key and the input value. The second PRF 135 will be much less computationally intensive than the first PRF 120 so that the MAC functionality may be implemented in constrained computing environment. The second PRF 135 may be executed 1.5×, 2×, 3×, 5×, 10×, or even more times faster than the first PRF 120 which will be a typical MAC function. As a result, the computation time of the second PRF 135 is significantly less than the computation time of the first PRF 120.

The combination function may be various functions such as a hash function.

Figure 2:
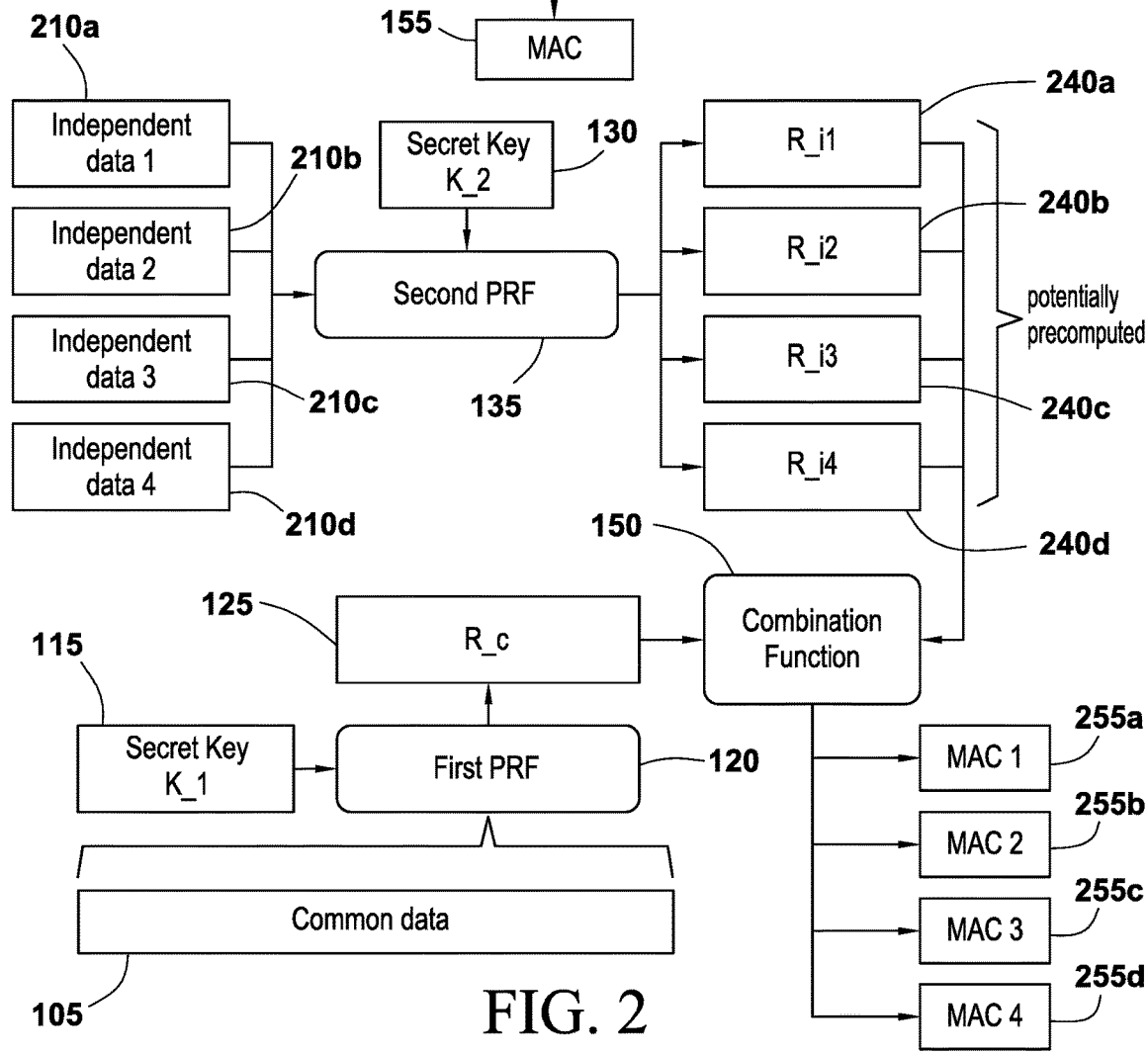
FIG. 2 illustrates a variation of FIG. 1 where there is a known set of independent data values that may be used.

FIG. 2 illustrates a variation of FIG. 1 where there is a known set of independent data values that may be used. In this example, there are four different values that the independent data 210a-210d may take. For example, if data is being broadcast to four different locations, then the independent data 210a-210d for the four locations is known and may be precomputed. In FIG. 2 there are four different values for the independent data 210a, 210b, 210c, 210d. Each of these is input to the first PRF 120 using the first secret key 115. As a result, four different R_i values 240a, 240b, 240c, 240d are produced. These R_i values 240a-240d may be stored. Then when the various independent data values are selected, the corresponding precomputed R_i values 240a-240d may be selected and used by the combination function 150. As the same data is broadcast to each of the four locations corresponding to the four independent data values 210a-210d, then the second PRF 135 only has to be calculated once resulting in R_c 125 that may be combined with each of the four R_i values 240a-240d resulting in four MAC values 255a, 255b, 255c, 255d. This leads to a further reduction of computing resources needed to produce MAC values for messages when the computing environment is constrained.

A possible embodiment of the second step would be applying the second PRF 135 to the independent data 110 and combining the output from the second PRF 135 with the output of the first PRF 120 for the common data 105 using an XOR and an alternating step generator to scramble the result. For example, in cryptography, an alternating step generator (ASG) is a cryptographic pseudorandom number generator intended to be used in a stream cipher.

Further, combining the output from the first PRF 120 and the output from the second PRF 135, may include using round-reduced block ciphers (e.g., AES with less rounds to increase performance) or stream ciphers with a reduced number of initialization rounds.

In another embodiment, any low-entropy parts of messages may be omitted from the message and reconstructed from the MAC. This may save network bandwidth when such bandwidth is constrained.

To avoid replay attacks in a system—where an attacker stores a message it has intercepted and resends it at a later time—it is common to include a counter in the authenticated part of the message. This allows the receiver to store the current counter value and discard messages with a lower value, i.e. old messages. To prevent replaying of messages this counter must be big enough to not wrap during the lifetime of the device. Sending this additional counter value "c" can be quite costly in constrained bandwidth scenarios. As a result an embodiment is described where only the lower "k" bits of this counter, i.e., $c \bmod 2^k$, are transmitted for some bit-length k. The remaining most significant bits of the counter, i.e., $c/2^k$, may be stored in the devices that are communicating and only need to be updated occasionally. This strategy creates a problem whenever c increases such that $c \bmod 2^k = 0$ (i.e., the k least significant bits of the counter "wrap"). In this case the stored counter value becomes incorrect. Because the receiver now uses an incorrect counter value to calculate the MAC, valid messages will seem invalid. This may be compensated for by trying several values for the stored counter. Suppose the stored counter value is "n", the receiver could try "n", "n+1", "n+2", ..., "n+i" for some parameter "i". This will prevent the receiver from losing messages when the sent part of the counter wraps. Unfortunately, for extremely constrained devices it may not be feasible to calculate "i" MAC values for each received message. As a result the MAC may be calculated using a two-part procedure similar to that described above.

Figure 3:
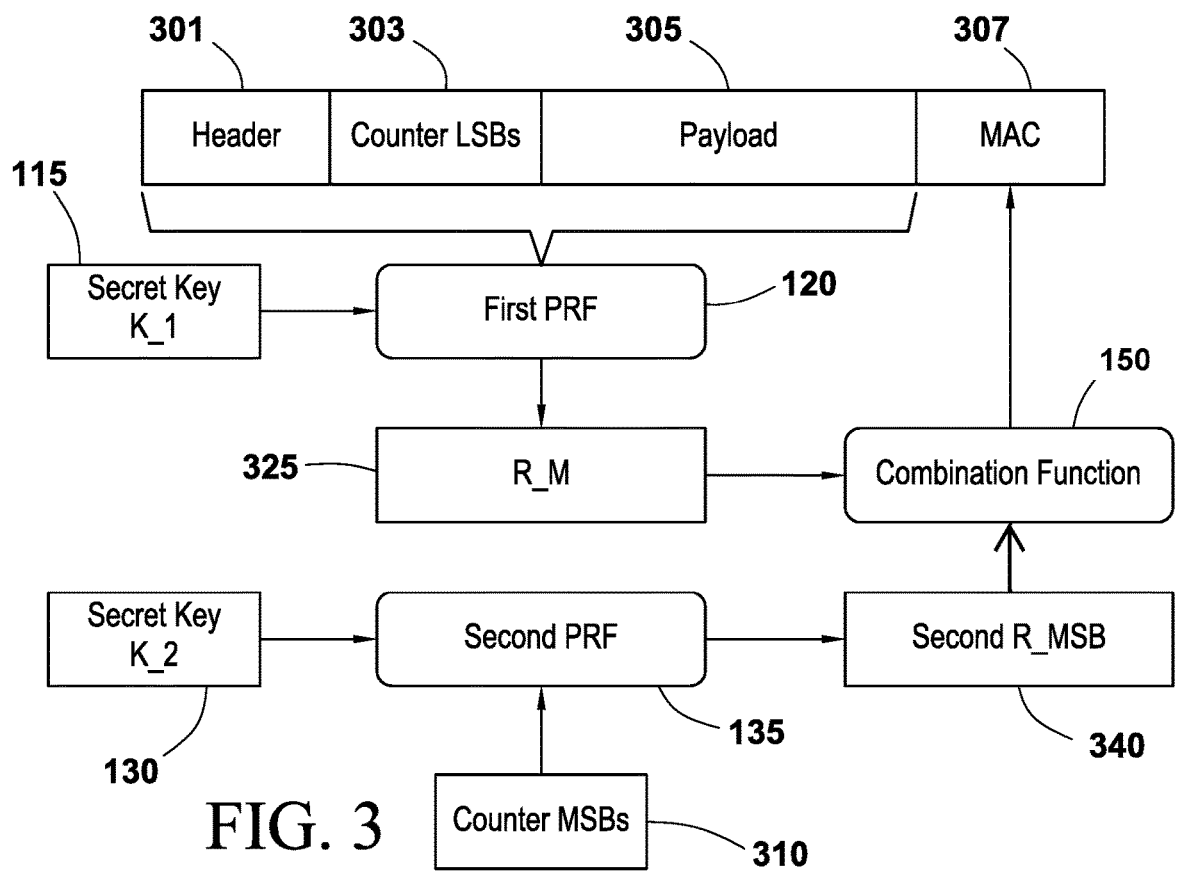
FIG. 3 illustrates a two-step calculation of a MAC for a message including only the least significant bits of a message counter.

FIG. 3 illustrates a two-step calculation of a MAC for a message including only the least significant bits of a message counter. In this embodiment, the message may include a header 301, counter least significant bits (LSBs) 303, a payload 305, and the MAC 307. A first PRF 120 may be applied to the common data 105 using a first secret key 115. As described above, the first PRF 120 may be any known MAC function that uses a secret key. The output of the first PRF 120 is R_M 325. A second PRF 135 may be applied to the counter most significant bits (MSBs) 110 using a second secret key 130. The output of the second PRF 135 is R_MSB 340. A combination function 150 may then be applied to R_M 325 and R_MSB 340 to produce the MAC 307 of the input message. The first PRF 120, the second PRF 135, and the combination function 150 may be the same as described above.

The steps described in FIG. 3 will be carried out by the device that receives the message and the associated MAC. The calculated MAC will be compared to the received MAC. If they do not match, then the value of the counter MSBs maintained by the receiving device may be incremented, and the value for R_MSB recalculated, and the MAC recalculated and compared to the received MAC. This may be repeated until the received MAC and calculated MAC are equal or for up to i iterations. If no match is found, the message is rejected and the value of the counter MSBs 310 is maintained. If a match is found, the message is accepted. If no iterations on the counter MSBs 310 is needed, then the values of the counter MSBs 310 is kept the same, otherwise the counter MSBs 310 is updated based upon the number of iterations needed to find a match.

Figure 4:
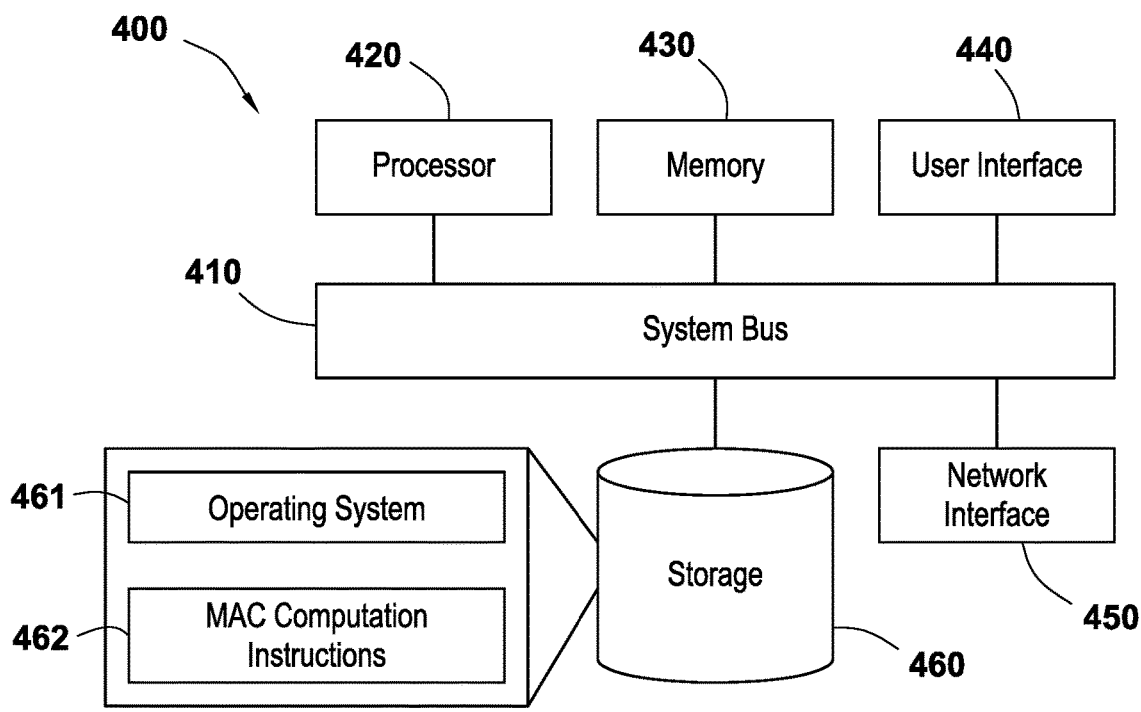
FIG. 4 illustrates an exemplary hardware diagram 400 for implementing the calculation of the MAC.

FIG. 4 illustrates an exemplary device 400 for implementing the calculation of the MAC. The exemplary device 400 may perform the MAC process illustrated in FIGS. 1-3. Such hardware may be found in network nodes or devices performing the MAC process illustrated in FIGS. 1-3. As shown, the device 400 includes a processor 420, memory 430, user interface 440, network interface 450, and storage 460 interconnected via one or more system buses 410. It will be understood that FIG. 4 constitutes, in some respects, an abstraction and that the actual organization of the components of the device 400 may be more complex than illustrated.

The processor 420 may be any hardware device capable of executing instructions stored in memory 430 or storage 460 or otherwise processing data. As such, the processor 420 may include a microprocessor, field programmable gate array (FPGA), application-specific integrated circuit (ASIC), or other similar devices. As described above the processor 420 may have limited processing capabilities. Further the processor 420 may be a secure processor.

The memory 430 may include various memories such as, for example L1, L2, or L3 cache or system memory. As such, the memory 430 may include static random access memory (SRAM), dynamic RAM (DRAM), flash memory, read only memory (ROM), or other similar memory devices.

The user interface 440 may include one or more devices for enabling communication with a user such as an administrator or a network management system or a host device. For example, the user interface 440 may include a display, a mouse, and a keyboard for receiving user commands. In some embodiments, the user interface 440 may include a command line interface or graphical user interface that may be presented to a remote terminal via the network interface 450.

The network interface 450 may include one or more devices for enabling communication with other hardware devices. For example, the network interface 450 may include a network interface card (NIC) configured to communicate according to the Ethernet protocol. Additionally, the network interface 450 may implement a TCP/IP stack for communication according to the TCP/IP protocols. Various alternative or additional hardware or configurations for the network interface 450 will be apparent. The network interface 450 may interface with a network having constrained bandwidth.

The storage 460 may include one or more machine-readable storage media such as read-only memory (ROM), random-access memory (RAM), magnetic disk storage media, optical storage media, flash-memory devices, or similar storage media. In various embodiments, the storage 460 may store instructions for execution by the processor 420 or data upon with the processor 420 may operate. For example, the storage 460 may store a base operating system 461 for controlling various basic operations of the device 400. Further, the storage 460 may store MAC computation instructions 462 that calculate the MAC as described above. Also, the storage 460 may be secure storage that resists tampering or reading by an unauthorized party.

It will be apparent that various information described as stored in the storage 460 may be additionally or alternatively stored in the memory 430. In this respect, the memory 430 may also be considered to constitute a "storage device" and the storage 460 may be considered a "memory." Various other arrangements will be apparent. Further, the memory 430 and storage 460 may both be considered to be "non-transitory machine-readable media." As used herein, the term "non-transitory" will be understood to exclude transitory signals but to include all forms of storage, including both volatile and non-volatile memories. The memory 430 may also be secure memory that is tamper resistant and that prevents unauthorized access.

While the device 400 is shown as including one of each described component, the various components may be duplicated in various embodiments. For example, the processor 420 may include multiple microprocessors that are configured to independently execute the methods described herein or are configured to perform steps or subroutines of the methods described herein such that the multiple processors cooperate to achieve the functionality described herein. For example, the first PRF 120 and the second PRF 135 may be implemented in two different microprocessors or cores of a microprocessor.

A method according to the embodiments of the invention may be implemented on a computer as a computer implemented method. Executable code for a method according to the invention may be stored on a computer program medium. Examples of computer program media include memory devices, optical storage devices, integrated circuits, servers, online software, etc. Accordingly, key delivery systems described herein may include a computer implementing a computer program. Such system, may also include other hardware elements including storage, network interface for transmission of data with external systems as well as among elements of the key delivery systems.

In an embodiment of the invention, the computer program may include computer program code adapted to perform all the steps of a method according to the invention when the computer program is run on a computer. Preferably, the computer program is embodied on a non-transitory computer readable medium.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of computing a message authentication code (MAC) for a message having a common part and an independent part using a constrained processor, the method comprising:
performing a MAC function on only the common part of the message using a first secret key to produce a first output;
performing a pseudorandom function on only the independent part of the message using a second secret key to produce a second output; and
combining the first output and the second output to produce a computed MAC for the message.

2. The method of claim 1, wherein combining the first output and the second output to produce the computed MAC for the message further comprises:
performing a hash function on the first output and the second output.

3. The method of claim 1, wherein combining the first output and the second output to produce the computed MAC for the message further comprises:
XORing the first output and the second output to produce an XOR output; and
executing an alternating step generator on the XOR output.

4. The method of claim 1, wherein combining the first output and the second output to produce the computed MAC for the message further comprises:
inputting the first output and the second output to a reduced round block cipher.

5. The method of claim 1, wherein combining the first output and the second output to produce the computed MAC for the message further comprises:
applying a stream cipher with a reduced number of initialization rounds to the first output and the second output.

6. The method of claim 1, further comprising:
receiving the message along with a message MAC; and
comparing the message MAC to the computed MAC.

7. The method of claim 6, further comprising:
appending the message MAC to the message; and
transmitting the message and the appended message MAC.

8. The method of claim 6, wherein performing the pseudorandom function on the independent part of the message using the second secret key to produce the second output further comprises:
precomputing the pseudorandom function for a known set of values for the independent part of the message;
storing the precomputed second output values;
selecting a corresponding precomputed second output value when the independent part of the message is a value in the known set of values; and
comparing the message MAC to the computed MAC.

9. The method of claim 5, further comprising:
receiving N broadcast messages, wherein N is an integer; and
combining the first output with each of N precomputed second outputs corresponding to each of the received N broadcast messages.

10. A method of computing a message authentication code (MAC) for a message having a header, a payload, and a counter with most significant bits (MSBs) and least significant bits (LSBs) using a constrained processor, the method comprising:
performing a MAC function on the header, the payload, and only the LSBs using a first secret key to produce a first output;
performing a pseudorandom function on only the MSBs using a second secret key to produce a second output;
combining the first output and the second output to produce a computed MAC for the message; and
transmitting the header, the payload, the LSBs, and the computed MAC.

11. The method of claim 10, wherein combining the first output and the second output to produce the computed MAC for the message further comprises:
performing a hash function on the first output and the second output.

12. The method of claim 10, wherein combining the first output and the second output to produce the computed MAC for the message further comprises:
XORing the first output and the second output to produce an XOR output; and
executing an alternating step generator on the XOR output.

13. The method of claim 10, wherein combining the first output and the second output to produce the computed MAC for the message further comprises:
inputting the first output and the second output to a reduced round block cipher.

14. The method of claim 10, wherein combining the first output and the second output to produce the computed MAC for the message further comprises:
applying a stream cipher with a reduced number of initialization rounds to the first output and the second output.

15. A method of computing a message authentication code (MAC) for a received message having a header, a payload, and least significant bits (LSBs) of a counter and most significant bits (MSBs) using a constrained processor, the method comprising:
receiving the message along with a message MAC;
performing a MAC function on the header, the payload, and only the LSBs using a first secret key to produce a first output;
performing a pseudorandom function on only the MSBs using a second secret key to produce a second output;
combining the first output and the second output to produce a computed MAC for the message; and
comparing the message MAC to the computed MAC.

16. The method of claim 15, further comprising:
when the computed MAC is not equal to the message MAC, repeating until the computed MAC equals the message MAC or until M iterations have been performed where M is an integer:
incrementing the value of the MSBs by one;
performing a pseudorandom function on the incremented MSBs using the second secret key to produce the second output;

combining the first output and the second output to produce the computed MAC for the message; and comparing the message MAC to the computed MAC.

17. The method of claim 15, wherein combining the first output and the second output to produce the computed MAC for the message further comprises:

performing a hash function on the first output and the second output.

18. The method of claim 15, wherein combining the first output and the second output to produce the computed MAC for the message further comprises:

XORing the first output and the second output to produce an XOR output; and executing an alternating step generator on the XOR output.

19. The method of claim 15, wherein combining the first output and the second output to produce the computed MAC for the message further comprises:

inputting the first output and the second output to a reduced round block cipher.

20. The method of claim 15, wherein combining the first output and the second output to produce the computed MAC for the message further comprises:

applying a stream cipher with a reduced number of initialization rounds to the first output and the second output.

* * * * *